US008177023B2

(12) United States Patent
Peltola et al.

(10) Patent No.: US 8,177,023 B2
(45) Date of Patent: May 15, 2012

(54) SOUND DAMPENING HOUSING FOR ROCK DRILL

(75) Inventors: Seppo Peltola, Tampere (FI); Ari Haavisto, Lempäälä (FI)

(73) Assignee: Sandvik Mining and Construction Oy, Tampere (FI)

( * ) Notice: Subject to any disclaimer, the term of this patent is extended or adjusted under 35 U.S.C. 154(b) by 12 days.

(21) Appl. No.: 12/594,484

(22) PCT Filed: Apr. 4, 2008

(86) PCT No.: PCT/FI2008/050165

§ 371 (c)(1), (2), (4) Date: Oct. 2, 2009

(87) PCT Pub. No.: WO2008/122694

PCT Pub. Date: Oct. 16, 2008

(65) Prior Publication Data

US 2010/0084218 A1 Apr. 8, 2010

(30) Foreign Application Priority Data

Apr. 4, 2007 (FI) ..................................... 20075230

(51) Int. Cl.

| | |
|---|---|
| ***B25D 17/11*** | (2006.01) |
| ***E21B 19/08*** | (2006.01) |
| ***F01N 1/08*** | (2006.01) |
| ***G10K 11/04*** | (2006.01) |
| ***H02K 5/24*** | (2006.01) |

(52) U.S. Cl. ............... 181/200; 173/162.1; 173/DIG. 2; 175/162; 181/202; 181/230

(58) Field of Classification Search .................. 181/200, 181/230; 175/162

See application file for complete search history.

(56) References Cited

U.S. PATENT DOCUMENTS

| | | | | |
|---|---|---|---|---|
| 2,136,315 | A * | 11/1938 | Pettit | 299/37.4 |
| 3,601,205 | A * | 8/1971 | Kurt | 173/105 |
| 3,667,571 | A * | 6/1972 | Fattelay | 181/230 |
| 4,402,383 | A * | 9/1983 | Bailey | 181/202 |
| 6,199,656 | B1 * | 3/2001 | Vento et al. | 181/200 |
| 2008/0142270 | A1 * | 6/2008 | Haglund | 175/162 |
| 2009/0266617 | A1 * | 10/2009 | Haglund | 175/325.1 |

(Continued)

FOREIGN PATENT DOCUMENTS

FI 108561 3/2000

(Continued)

OTHER PUBLICATIONS

International Search Report mailed Jun. 24, 2008 issued in PCT Application No. PCT/FI2008/050165.

(Continued)

*Primary Examiner* — Elvin G Enad
*Assistant Examiner* — Christina Russell
(74) *Attorney, Agent, or Firm* — Morgan, Lewis & Bockius LLP

(57) ABSTRACT

The invention relates to a sound dampening housing for a rock drill which moves along a feed beam in a longitudinal direction thereof, the sound dampening housing being attachable to the feed beam of the rock drill on its both sides so that together with the feed beam the sound dampening housing constitutes a substantially closed space. The sound dampening housing is double-shelled, and an airspace is provided between its inner shell and its outer shell.

25 Claims, 2 Drawing Sheets

U.S. PATENT DOCUMENTS

| | | | | |
|---|---|---|---|---|
| 2010/0116555 | A1 * | 5/2010 | Peltola et al. | 175/315 |
| 2010/0270083 | A1 * | 10/2010 | Haglund | 175/162 |

FOREIGN PATENT DOCUMENTS

| | | | | |
|---|---|---|---|---|
| JP | 05079271 | A | * | 3/1993 |
| JP | 5-295978 | | | 11/1993 |
| JP | 05293773 | A | * | 11/1993 |
| JP | 05295978 | A | * | 11/1993 |
| JP | 07-301082 | A | | 11/1995 |
| JP | 07301082 | A | * | 11/1995 |
| KR | 20-0389661 | Y1 | | 7/2005 |
| SE | 523874 | | | 5/2004 |
| SU | 480836 | | | 8/1975 |
| WO | 00/39412 | | | 7/2000 |
| WO | 02/070856 | | | 9/2002 |
| WO | WO 02070856 | A1 | * | 9/2002 |
| WO | 2006/038850 | | | 4/2006 |
| WO | WO 2008007820 | A1 | * | 1/2008 |

OTHER PUBLICATIONS

International Preliminary Report on Patentability completed Jun. 16, 2009 issued in PCT Application No. PCT/FI2008/050165.

* cited by examiner

SOUND DAMPENING HOUSING FOR ROCK DRILL

CROSS REFERENCE TO RELATED APPLICATIONS

This application is a §371 National Stage Application of International Application No. PCT/FI2008/050165, filed Apr. 4, 2008, and claims priority under 35 U.S.C. §119 and/or §365 to Finnish Application No. 20075230, filed Apr. 4, 2007.

BACKGROUND OF THE INVENTION

The invention relates to a sound dampening housing for a rock drill which moves along a feed beam in a longitudinal direction thereof, the sound dampening housing being attachable to the feed beam of the rock drill on its both sides so that together with the feed beam the sound dampening housing constitutes a substantially closed space within which the rock drill and at least a main part of a drill rod outside a hole are located.

When drilling rock, drill rigs are used that comprise one or more booms mounted on a base and a drill movably mounted on a feed beam provided on the boom(s). Often the feed beam is also installed at an end of a boom movably in its longitudinal direction by a separate cradle so as to enable the feed beam to be arranged in a desired position and in a desired direction for drilling. In view of these various movements of the boom and the feed beam, the drill rig is provided with various transfer cylinders or hydraulic motors known per se that are driven by pressure fluid.

A typical problem in rock drilling is noise. The noise is produced by a rock drill impacting on a head of a tool and the tool impacting on rock, as well as by various other movements, such as rotation, etc. The noise, which propagates even quite widely to the neighbourhood, keeps causing more and more problems, particularly in the vicinity of housing areas. In order to prevent the noise from causing restrictions on working hours or sites, attempts have been made to solve the issue particularly in surface drilling by using various noise damping housings around the feed beam and the drill. Such solutions are known e.g. from WO 2006/038850, WO 00/39412, SE 523874, U.S. Pat. No. 3,667,571, and JP 5-295978. The problem with all these solutions is that they are difficult to implement or they do not dampen the noise over the entire area of the drill. In addition, the mechanical apparatuses used for opening the sound dampening housing when replacing or adding a drill rod are complex and laborious. Further, the sound dampening housings are quite large and heavy, which makes them difficult to manufacture and use.

BRIEF DESCRIPTION OF THE INVENTION

An object of the present invention is to provide a sound dampening housing with a lighter structure and a better sound dampening capability.

The sound dampening housing according to the invention is characterized in that at least part of the sound dampening housing is formed from two shells, i.e. an inner shell and an outer shell, arranged one within another and attached to one another so as to form a substantially stiff unity and a space containing air or another gas or a gaseous mixture being provided therebetween.

An idea underlying the invention is that the sound dampening housing is at least partly double-shelled such that it comprises an inner shell, i.e. an inner surface layer, and an outer shell, i.e. an outer surface layer, an airspace being provided therebetween so as to produce a stiff and sound dampening structure. According to an embodiment of the invention, the sound dampening housing is formed from a plurality of housing components attached to one another, each component being double-shelled.

An advantage of the sound dampening housing according to the invention is that when a double-shell structure is used wherein only air is provided between the shells, the result is a sound damping housing whose structure is stiff and whose dampening properties are good but which, nevertheless, is quite light. It is also easy to manufacture such a sound dampening housing from appropriately dimensioned and shaped components since the components are easy to attach to one another such that also the joints can be made noise insulating.

BRIEF DESCRIPTION OF THE DRAWINGS

The invention will be described in closer detail in the accompanying drawings, in which FIG. 1 schematically shows a drill rig provided with a sound dampening sound dampening housing.

DETAILED DESCRIPTION OF SOME EMBODIMENTS OF THE INVENTION

Figure 1:
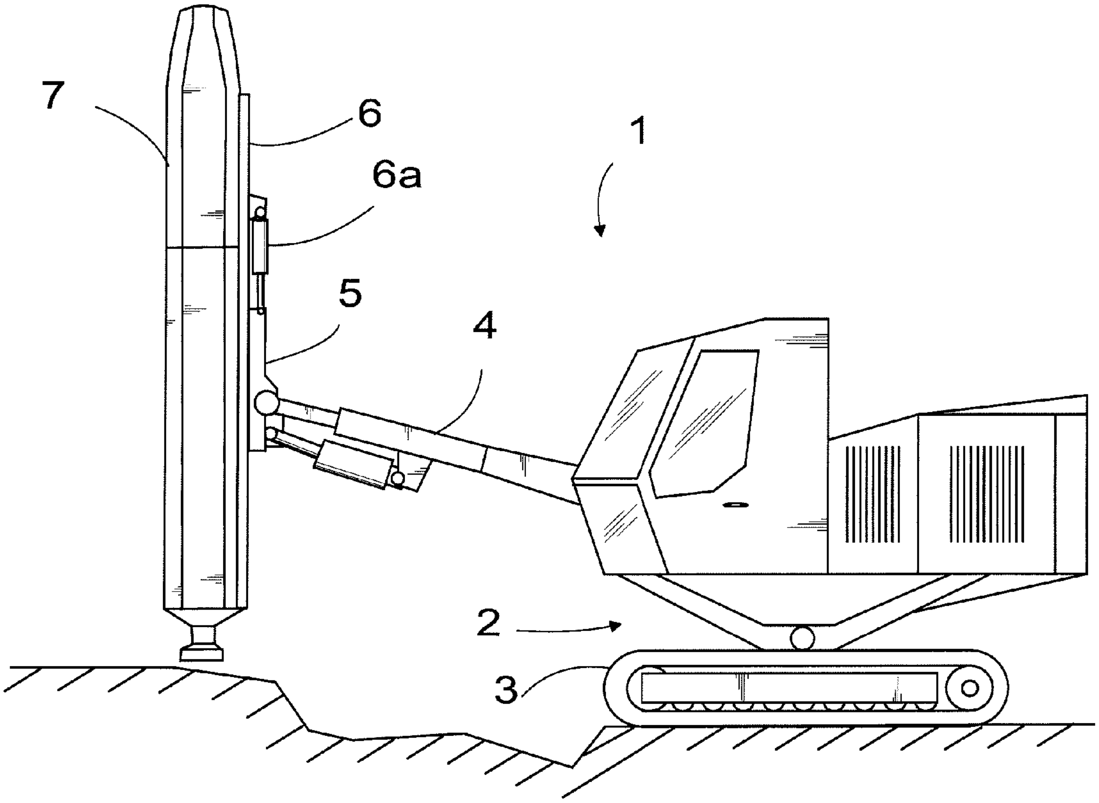

FIG. 1 schematically shows a drill rig 1 provided with a base 2. The base is usually provided with wheels or rollers, in this case, by way of example, with rollers 3. A boom 4 which, in a manner known per se, may consist of one or more boom parts, in the figure by way of example of one part, is attached to the base 2 in a manner known per se. The boom 4 may be any boom structure known per se; therefore, it is not necessary to explain the boom in greater detail. In a manner known per se but not shown in the figure, the boom 4 is articulated to the base 2 so as to enable the boom to be turned to a desired angle with respect to the base by means of power members known per se, such as pressure medium cylinders or the like.

One end of the boom 4, rotatably therewith, is provided with a cradle 5 which, in turn, is provided with a feed beam 6 movable in its longitudinal direction. The feed beam 6 may be moved with respect to the cradle 5 by a pressure medium cylinder 6*a* in a manner known per se. The feed beam 6 is provided with a rock drill (not shown) known per se for drilling holes by means of a tool, i.e. a drill rod, shown in connection with FIG. 2, and a commonly known drill bit connected thereto. The feed beam and the rock drill as well as part of the drill rod are surrounded by a sound dampening housing 7 whose structure will be described in closer detail in the following drawings.

Figure 2:
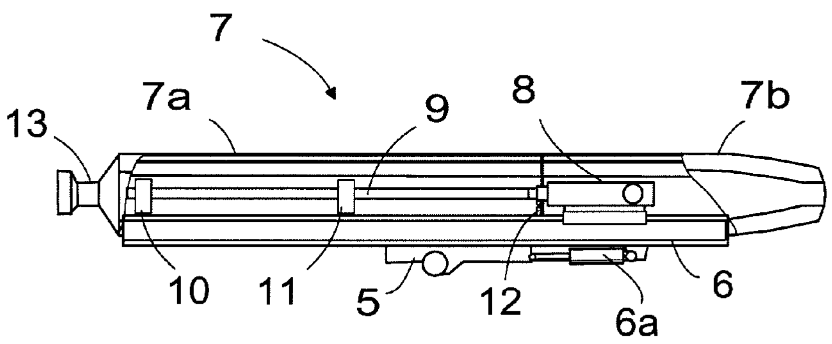
FIG. 2 is a schematic, partially sectioned side view showing the sound dampening housing of FIG. 1.

FIG. 2 is a schematic, sectional side view showing a sound dampening housing. Herein, the sound dampening housing 7 is by way of example formed from two different parts; 7*a*, which serves as a cover part for the sound dampening housing 7 at the drill rod, and 7*b*, each manufactured separately. The number of parts may vary as appropriate for manufacture, and a plurality of parts may be provided. The parts are mainly attached to one another so as to constitute a uniform sound dampening housing 7 with joints sealed appropriately, and the sound dampening housing 7 is attached to the feed beam of the rock drill so as to surround the upper part of the feed beam 6 as well as the rock drill 8, drill rod 9 and drill guides 10 and 11. The cover part 7*a* is installed movably in a transverse direction with respect to the sound dampening housing 7, to be moved by separate transfer cylinders 12. This will be described separately in more detail in FIG. 4. Further, one end of the sound dampening housing 7, i.e. an end facing the drill bit, is provided with a nozzle part 13 for dust suction and sound dampening.

Figure 3:
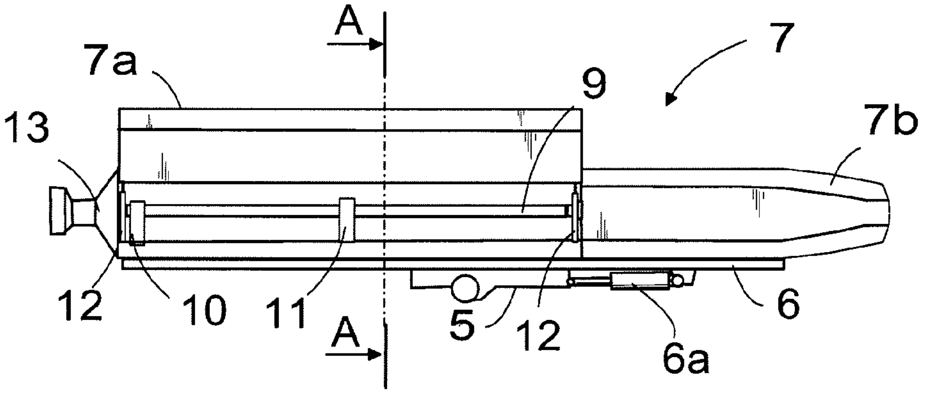
FIG. 3 is a schematic side view showing a sound dampening housing with a cover part of a drill rod opened, FIG. 4 schematically shows a section taken along A-A in FIG. 3.

FIG. 3 schematically shows a sound dampening housing with a cover part 7*a* of a drill rod opened. It shows how the cover part 7*a* necessary for handling the drill rod 9 has been lifted up from the sound dampening housing 7 for installation of the drill rod in the drill rig or for removal of the drill rod therefrom. Both ends of the cover part 7*a*, on both sides of the feed beam 6, are provided with transfer cylinders 12 for enabling the cover part 7*a* to be moved away from the sound dampening housing 7 and thus an opening to be provided for handling the drill rod and, correspondingly, for enabling the cover part to be moved so that it becomes attached to the sound dampening housing 7 for the duration of drilling.

For installation and removal of the drill rod, a sufficiently large and long opening is to be provided between the sound dampening housing 7 and the cover part 7*a*. Therefore, in the longitudinal direction of the sound dampening housing 7 and the feed beam 6 the transfer cylinders 12 are situated at a distance from one another enabling the drill rod 9 to be moved from between the transfer cylinders 12 in between the sound dampening housing 7 and the cover part 7*a* and, correspondingly, away therefrom. The travelling length of the transfer cylinders 12 may be selected differently. They may either be equal in length or their travelling length may be different on different sides of the sound dampening housing, in which case the cover part 7*a* is, in a manner of speaking, made to turn in a transverse direction of the sound dampening housing 7 a distance out of the way of the drill rod.

Figure 4:
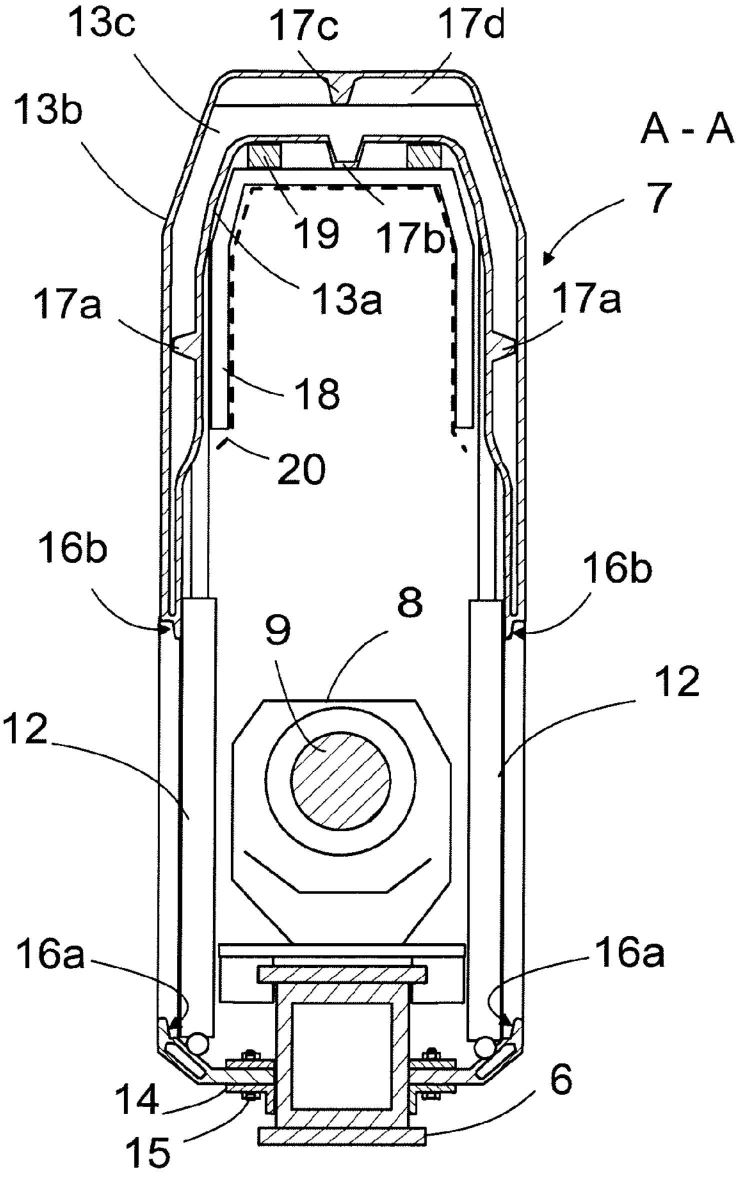

FIG. 4 schematically shows a cross section of the sound dampening housing taken along A-A in FIG. 3. As shown in FIG. 4, the sound dampening housing has two shells, i.e. it is provided with an inner shell 13*a*, and an outer shell 13*b*, and mainly an airspace 13*c* therebetween. The shells are manufactured from a material that may be easily shaped e.g. by a centrifugal casting method. The shells are attached to one another by their edges in order to produce a uniform structure such that a structure is formed wherein a space 13*c* is provided between the shells for air or, if desired, another gas or a gaseous mixture. The shells themselves are made of a material that relatively well dampens propagation of high impact sounds, typically of polyethene or a corresponding plastic material. Thanks to the double shell, the structure of the sound dampening housing is stiff and it dampens the propagation of noise well.

Various intermediate parts interconnecting the shells may be provided between the shells, such as sleeve-like lead-throughs, for attaching different parts to the sound dampening housing. The cross-section of the outer shell and the inner shell is shaped such that on one hand they stiffen the sound dampening housing and on the other hand they dampen noise as well as possible. This, on one hand, enables a robust structure to be achieved and, on the other hand, the cover part 7*a* of the sound dampening housing to be moved so that it becomes attached to the sound dampening housing 7 tightly and steadily such that the gap therebetween is sealed and noise-dampening remains efficient. FIG. 4 also shows how the sound dampening housing becomes attached to battens 14 fastened to the sides of the feed beam 6 by separate fastening members, such as screws or the like 15. A separate, for instance softer sealing material with better noise dampening properties may be provided between the edges of the sound dampening housing 7 and the feed beam 6. The sealing material as such may also be the same material as that used for the rest of the sound dampening housing.

It is particularly to be noted herein that a way to seal a seam between the cover part 7*a* and the sound dampening housing 7 is to use slanting surfaces 16*a* and 16*b* in the edges of the sound dampening housing and the cover part such that when the cover part 7*a* is moved so that it becomes attached to the sound dampening housing, the slant surfaces 16*a* and 16*b* are pressed against one another, constituting a compressed sealing joint. The seams between the cover part 7*a* and the rest of the sound dampening housing may, of course, also be sealed by separate seals in manners known per se.

In both shells 13*a* and 13*b*, respectively, ribs 17*a* to 17*d* can be seen. In the shell 13*a*, the longitudinal ribs 17*a* reside on the side of the airspace 13*c* between the shells 13*a* and 13*b* while the rib 17*b*, which, in a manner of speaking, is a fold formed in the shell, in turn resides on the inside of the shell 13*a*, i.e. in the same space as the rock drill. Similarly, in the shell 13*b*, a longitudinal rib 17*c* and a transverse rib 17*d* are both provided on the side of the airspace 13*c* between the shells 13*a* and 13*b*. Such ribs may be provided only in one of the shells or in both shells, either longitudinally or transversely. Further, they may be provided either on the outside or inside of a shell. If a rib is provided between shells, it may even extend all the way to the other shell. The ribs serve to stiffen a shell, if so required by the material of the shell. The ribs may be either completely solid or they may be hollow or folds provided in a shell.

The travelling length of the transfer cylinders 12 may be selected in different ways. They may be either equal in length or their travelling length may be different in different sides of the sound dampening housing, enabling, in a manner of speaking, the sound dampening housing to turn a distance out of the way of the drill rod.

When necessary, the inside of the housing 7 may be provided with separate support members attached to the sound dampening housing 7, such as supporting arches 18 and supporting bars 19 in the longitudinal direction of the sound dampening housing, to stiffen the sound dampening housing 7. The material of the arches 18 and the bars 19 may be solid, but preferably they are hollow tubular or open profiles, such as U, I, and L profiles. The arches and bars may be structures fixedly integrated with one another or separate parts attached to one another. It is, of course, obvious that the support members of the cover part 7*a* constitute a unity of their own while the support members of the rest of the sound dampening housing, i.e. the portion attached to the feed beam 6, constitute a unity of their own. Further, the inside of the sound dampening housing 7 may be provided with a dampening plate 20 made of a separate dampening material, which at least partly covers the inner surface of the sound dampening housing 7. Such a plate may be e.g. a perforated plate made of metal or another material, attached, for instance resting on supporting arches 18 and supporting bars, to a side opposite the sound dampening housing 7. The dampening plate may be completely or only partly perforated or even unperforated, as necessary. The dampening plate 20 may also be used without support members, in which case it is naturally attached to the sound dampening housing 7 directly so as to rest on separate support sleeves or the like and/or to the ribs facing the inside of the inner shell 13*a*.

In the above description and drawings, the invention has been described only by way of example, and it is by no means restricted thereto. The point is that the sound dampening housing, together with its parts, is formed from two shells located at a distance from one another such that a space is provided therebetween for air or gas.

The invention claimed is:

1. A sound dampening housing for a rock drill which moves along a feed beam in a longitudinal direction thereof, the sound dampening housing being attachable to the feed beam of the rock drill on its both sides so that together with the feed beam the sound dampening housing constitutes a substantially closed space within which the rock drill and at least a main part of a drill rod outside a hole are located, wherein at least part of the sound dampening housing is formed from two shells, an inner shell and an outer shell, arranged one within another and attached to one another so as to form a stiff unity and a space containing air or another gas or a gaseous mixture being provided therebetween.

2. A sound dampening housing as claimed in claim 1, wherein the sound dampening housing is formed from a plurality of housing components attached to one another so as to form a sound dampening housing with substantially tight joints.

3. A sound dampening housing as claimed in claim 2, wherein the sound dampening housing comprises a separate cover part which is movable from its position for installation or removal of the drill rod.

4. A sound dampening housing as claimed in claim 3, wherein the cover part is installed to move with respect to the sound dampening housing substantially perpendicularly away from the sound dampening housing and, similarly, towards the sound dampening housing.

5. A sound dampening housing as claimed in claim 1, wherein the sound dampening housing comprises a separate cover part which is movable from its position for installation or removal of the drill rod.

6. A sound dampening housing as claimed in claim 5, wherein the cover part is installed to move with respect to the sound dampening housing substantially perpendicularly away from the sound dampening housing and, similarly, towards the sound dampening housing.

7. A sound dampening housing as in claim 5 or 3, wherein the cover part is installed to be movable by transfer cylinders provided on both sides of an opening of the cover part and, similarly, at both ends of the cover part, a distance of the transfer cylinders in a longitudinal direction of the sound dampening housing being greater than a length of the drill rod.

8. A sound dampening housing as claimed in claim 7, wherein edges of the cover part and the sound dampening housing are provided with surfaces slanting in the same direction with respect to one another so that when the cover part is closed, they are pressed substantially tightly against one another.

9. A sound dampening housing as claimed in claim 8, wherein the sound dampening housing comprises separate support members attached to the sound dampening housing so as to stiffen the sound dampening housing.

10. A sound dampening housing as claimed in claim 9, wherein the support members attached to the sound dampening housing comprise supporting arches and supporting bars in the longitudinal direction of the sound dampening housing.

11. A sound dampening housing as in claim 5 or 3, wherein edges of the cover part and the sound dampening housing are provided with surfaces slanting in the same direction with respect to one another so that when the cover part is closed, they are pressed substantially tightly against one another.

12. A sound dampening housing as claimed in claim 11, wherein the sound dampening housing comprises separate support members attached to the sound dampening housing so as to stiffen the sound dampening housing.

13. A sound dampening housing as claimed in claim 12, wherein the sound dampening housing is provided with at least one separate dampening plate inside the sound dampening housing which dampening plate at least partly covers an inner surface of the sound dampening housing.

14. A sound dampening housing as claimed in claim 12, wherein the support members attached to the sound dampening housing comprise supporting arches and supporting bars in the longitudinal direction of the sound dampening housing.

15. A sound dampening housing as in claim 5 or 3, wherein the sound dampening housing comprises separate support members attached to the sound dampening housing so as to stiffen the sound dampening housing.

16. A sound dampening housing as claimed in claim 15, wherein the sound dampening housing is provided with at least one separate dampening plate inside the sound dampening housing which dampening plate at least partly covers an inner surface of the sound dampening housing.

17. A sound dampening housing as claimed in claim 16, wherein at least a part of a surface of the dampening plate is perforated.

18. A sound dampening housing as claimed in claim 15, wherein the support members attached to the sound dampening housing comprise supporting arches and supporting bars in the longitudinal direction of the sound dampening housing.

19. A sound dampening housing as in claim 5 or 3, wherein the sound dampening housing is provided with at least one separate dampening plate inside the sound dampening housing which dampening plate at least partly covers an inner surface of the sound dampening housing.

20. A sound dampening housing as claimed in claim 19, wherein at least a part of a surface of the dampening plate is perforated.

21. A sound dampening housing as claimed in claim 19, wherein the dampening plate is made of the same material as the sound dampening housing.

22. A sound dampening housing as claimed in claim 19, wherein the dampening plate is made of metal.

23. A sound dampening housing as claimed in claim 19, wherein the dampening plate is attached at a distance from a surface of the inner shell of the sound dampening housing.

24. A sound dampening housing as in any one of claims 1, 2 and 5, wherein feed equipment for the rock drill is located inside the sound dampening housing.

25. A sound dampening housing for a rock drill which moves along a feed beam in a longitudinal direction thereof, the sound dampening housing being attachable to the feed beam of the rock drill on its both sides so that together with the feed beam the sound dampening housing constitutes a substantially closed space within which the rock drill and at least a main part of a drill rod outside a hole are located, wherein part of the sound dampening housing includes only a single shell while another part of the sound dampening housing is formed from two shells, an inner shell and an outer shell, arranged one within another and attached to one another so as to form a stiff unity and a space containing air or another gas or a gaseous mixture being provided therebetween.

* * * * *